US012673752B2

(12) United States Patent
Hansen et al.

(10) Patent No.: US 12,673,752 B2
(45) Date of Patent: Jul. 7, 2026

(54) FLOATING VERTICAL WIND PROFILE SENSOR DEVICE AND METHOD OF DETERMINING A VERTICAL WIND PROFILE

(71) Applicant: ØRSTED WIND POWER A/S, Fredericia (DK)

(72) Inventors: Frederik Søndergaard Hansen, Fredericia (DK); Jacob Elneff Wehl, Fredericia (DK); Jan Sloth Møller, Fredericia (DK)

(73) Assignee: Ørsted Wind Power A/S, Fredericia (DK)

( * ) Notice: Subject to any disclaimer, the term of this patent is extended or adjusted under 35 U.S.C. 154(b) by 546 days.

(21) Appl. No.: 18/019,716

(22) PCT Filed: Jul. 19, 2022

(86) PCT No.: PCT/EP2022/070173
§ 371 (c)(1),
(2) Date: Feb. 3, 2023

(87) PCT Pub. No.: WO2023/001807
PCT Pub. Date: Jan. 26, 2023

(65) Prior Publication Data
US 2023/0356806 A1 Nov. 9, 2023

(30) Foreign Application Priority Data
Jul. 20, 2021 (EP) ..................................... 21186814

(51) Int. Cl.
B63B 21/50 (2006.01)
B63B 22/00 (2006.01)
(Continued)

(52) U.S. Cl.
CPC ........ B63B 21/50 (2013.01); *B63B 2022/006* (2013.01); *B63B 2035/007* (2013.01); *G01P 5/00* (2013.01); *G01W 1/02* (2013.01)

(58) Field of Classification Search
CPC .............. B63B 21/50; B63B 2022/006; B63B 2035/007
See application file for complete search history.

(56) References Cited

U.S. PATENT DOCUMENTS

| | | | | | |
|---|---|---|---|---|---|
| 9,676,455 | B2 * | 6/2017 | MacCready | .............. | G01P 5/06 |
| 10,011,337 | B2 * | 7/2018 | MacCready | ............. | B63G 8/08 |

(Continued)

FOREIGN PATENT DOCUMENTS

| | | |
|---|---|---|
| CN | 205554520 U | 9/2016 |
| CN | 111169596 A | 5/2020 |

(Continued)

OTHER PUBLICATIONS

International Search Report and Written Opinion; International Application No. PCT/EP2022/070173; Orsted Wind Power A/S; dated Oct. 25, 2022.

(Continued)

*Primary Examiner* — S. Joseph Morano
*Assistant Examiner* — Jovon E Hayes
(74) *Attorney, Agent, or Firm* — SandBright Intellectual PLLC; Robert D. Spendlove

(57) ABSTRACT
Floating vertical wind profile sensor or LiDAR device (1) comprising a vertical wind profile sensor sensor (8) for sensing a vertical wind profile, a self-propulsion system (24) for propelling the device through a body of water, and a deployable special mark (10), actuatable to switch between a deployed state for identifying the device as a special marker buoy and an undeployed state for identifying the device as a vessel. A controller (22) is provided for switch-
(Continued)

ing the device (1) from a vessel mode to a buoy mode when the vessel is anchored. The controller (22) switches the special mark (10) to the deployed state when the device (1) is in the buoy mode. The method involves the floating LiDAR device (1) navigating to a target location and the buoy mode being activated while vertical wind profile data are collected.

17 Claims, 5 Drawing Sheets

(51) Int. Cl.
| | |
|---|---|
| *B63B 35/00* | (2020.01) |
| *G01P 5/00* | (2006.01) |
| *G01W 1/02* | (2006.01) |

(56) References Cited

U.S. PATENT DOCUMENTS

| | | | | |
|---|---|---|---|---|
| 10,322,782 | B1 | 6/2019 | Brown et al. | |
| 10,697,777 | B1 * | 6/2020 | Robertson | G01C 21/203 |
| 11,679,895 | B2 * | 6/2023 | Sundararaj | B64D 45/04 |
| | | | | 701/16 |
| 11,808,570 | B2 * | 11/2023 | Beatty | G01C 13/002 |

| | | | | |
|---|---|---|---|---|
| D1,013,968 | S * | 2/2024 | Chen | D29/124 |
| 11,970,256 | B1 * | 4/2024 | Sauder, II | G01W 1/08 |
| 2017/0059333 | A1 * | 3/2017 | Ward | G01C 21/203 |

FOREIGN PATENT DOCUMENTS

| | | | | |
|---|---|---|---|---|
| CN | 109733537 B | | 8/2020 | |
| CN | 112114332 A | * | 12/2020 | G01S 17/58 |
| EP | 4122810 A1 | * | 1/2023 | B63B 21/50 |
| GB | 2573020 A | * | 10/2019 | G01C 21/203 |
| RU | 2013109185 A | * | 9/2014 | |
| WO | 2003062044 A1 | | 7/2003 | |
| WO | WO-03062044 A1 | * | 7/2003 | B63B 22/24 |
| WO | 2010030471 A2 | | 3/2010 | |
| WO | 2019200331 A1 | | 10/2019 | |

OTHER PUBLICATIONS

Intellectual Property Office of Taiwan, Application No. 11421027890; Notice of Examination Opinion and Search Report; Orsted Wind Power A/S; dated Sep. 25, 2025 (machine translation).

Cheng-Dar Yue, Yi-Shegn Chiu, Chien-Cheng Tu, & Ta-Hui Lin, Evaluation of an Offshore Wind Farm by Using Data from the Weather Station, Floating LiDAR, Mast, and MERRA, Energies, 13:185 (2020) (available at https://www.mdpi.com/1996-1073/13/1/185).

\* cited by examiner

FLOATING VERTICAL WIND PROFILE SENSOR DEVICE AND METHOD OF DETERMINING A VERTICAL WIND PROFILE

CROSS-REFERENCE TO EARLIER APPLICATION

This application is a § 371 National Stage Entry of PCT/EP2022/070173 filed Jul. 19, 2022 entitled "FLOATING VERTICAL WIND PROFILE SENSOR DEVICE AND METHOD OF DETERMINING A VERTICAL WIND PROFILE" which application claims priority to EP Application No. 21186814.6 filed Jul. 20, 2021. The entire content of each of these applications is incorporated herein by reference.

The present application concerns a floating vertical wind profile sensor device and a method of determining a vertical wind profile. The device may also determine other environmental data about a location. The present application is particularly relevant to an autonomous and/or remote-controlled floating LiDAR devices and a method of determining a vertical wind profile at a target offshore location by deploying the floating LiDAR device to the location.

Identifying potential locations for offshore windfarms is challenging. The wind profile at a particular site will have a significant bearing on the performance and economic viability of a wind farm. Historically, the wind characteristics at a potential site would be investigated by installing a meteorological mast with an anemometer at the site and then extrapolating out measurements across the wind farm location. More recently, to provide more cost effective and accurate measurements, there has been a shift toward using floating LiDAR devices, which are vertical wind profile sensor devices for measuring a vertical wind profile.

Floating LiDAR devices are buoys fitted with a vertical profiling LiDAR. The LiDAR focusses a laser vertically up and incorporates a sensor for detecting returning light scattered by particles and aerosols in the atmosphere. The measured returned signal may then be used to determine windspeed based on the doppler shift generated in the scattered light. Importantly, the use of a high intensity laser allows for a high measurement rate, such as 50 Hz per data point. This thereby avoids the measured windspeed being influenced by transitional and rotational movements of the device in the sea. In effect, the sampling rate is sufficiently fast to effectively freeze the motion of the buoy at the point of measurement.

In use, conventional floating LiDAR devices are towed to a target location, or are transported by a vessel to the target location and lifted into the sea. Once at the location, the devices are moored in place via a mooring yoke. The location is typically defined by a GPS position and a surrounding radius designating a zone within which the device may be moored. Vertical wind profile measurements are then taken over an extended period at this location, in some cases up to 12-24 months in order to gather wind profile data across multiple seasons.

Unfortunately, conventional floating LiDAR devices have several shortcomings. Firstly, because the devices are required to collect data over extended periods of time, they require significant power to sustain their sensor and telecommunications systems. To mitigate this problem, it has become common to fit small wind turbine generators and solar panels to the devices to top up stored energy supplies. However, the power generated by these renewable sources is often variable and hence is more difficult to account for as part of a power management system. As a consequence, it has become common provide floating LiDAR devices with a diesel generator or a hydrogen fuel cell to charge the batteries. However, reliance on such complex generators over long durations carries risks. For example, any fault with the generator could result in extended periods of data loss when renewable sources are insufficient to maintain system functions. Given the long duration for measurements and the relatively harsh environment, this presents a significant challenge, and may lead to long testing cycles needing to be repeated. Secondly, when a floating LiDAR device needs to be recovered early, for instance if the remaining stored energy capacity drops too low, if maintenance is required, or the device needs to be moved to a new location, the costs associated with this can be significant. For instance, it is necessary to schedule a suitable installation vessel and crew to navigate to the device's location to undertake the repairs or collect the device. In many cases, the device will need to be released from its mooring, and lifted onto the vessel or towed back to harbour. This introduces additional health and safety risks, and is also constrained by planning requirements due to the dependency on appropriate weather conditions and a relatively short supply of suitable installation vessels. As well as increasing costs, this also means there is a high risk of long periods of time where the device is not recording data because of the dependency on an installation vessel for deployment, maintenance, and decommissioning.

In view of the above there is a need for improved floating LiDAR devices and associated methods which seek to address the above shortcomings.

According to a first aspect of the present invention, there is provided a floating vertical wind profile sensor device comprising: a vertical wind profile sensor for sensing a vertical wind profile; a self-propulsion system for propelling the device through a body of water; a deployable special mark, actuatable to switch between a deployed state for identifying the device as a special marker buoy and an undeployed state for identifying the device as a vessel; and a controller for switching the device from a vessel mode to a buoy mode when the vessel is anchored, wherein the controller switches the special mark to the deployed state when the device is in the buoy mode.

In this way, a floating vertical wind profile sensor, such as a floating LiDAR device, is provided which is able to propel itself to a desired target location. As such, this negates the need for an installation vessel, such as a tow boat, thereby saving the associated time and costs of towing operations. Importantly, the device is able to switch between being identifiable as a vessel and a buoy under internationally recognised seafaring regulatory requirements, such as those specified by the International Association of Marine Aids to Navigation and Lighthouse Authorities (IALA). That is, by providing a deployable special mark, the device may be selectively identified as a special marker buoy, with a recognisable yellow colour and marker cross (St. Andrews Cross/Saltire) designating it a sea mark. This allows the device from a regulatory perspective to be anchored in a location, without a lookout, for an extended period of time, in the same way as any other marker buoy. Conversely, when switched to vessel mode, the retraction of the special marker allows the device to function as a self-propelled vessel, without risk of it being mis-identified as a stationary buoy under maritime pilotage conventions. This flexibility to allow autonomous switching between different types of characterizable seafaring bodies in turn allows wind profile measurements to be taken in new ways. For instance, the device may move autonomously, or under remote control, between locations to gather data from a number of positions. The device may also return to harbour, autonomously or under remote control, for recharging and refilling if its energy stores drop to low. This may thereby allow measurements to be taken over longer periods, or using smaller devices, without needing to call on a installation vessel. Similarly, detected faults may more easily be repaired by calling the device to return to harbour for manned repair of the vessel as needed. In embodiments, the device may comprise one or more cameras for providing a video feed for remote monitoring of the device.

In embodiments, the floating vertical wind profile sensor device further comprises: an automated anchoring mechanism for deploying and retracting an anchor on an anchor chain, and wherein the controller is configured to control the automated anchoring mechanism to deploy the anchor when the device is in the buoy mode. In this way, the device may anchor itself in a desired target location automatically. This facilitates autonomous deployment of the device at a prospective wind farm location, with the device being able to physically anchor itself at that location.

In embodiments, the automated anchoring mechanism comprises a motorised anchor windlass, wherein the controller controls the motorised anchor windlass. In this way, the controller may control the anchor mechanism to instigate deployment and retraction of the anchor.

In embodiments, the controller receives feedback from one or more anchor deployment sensors, wherein the controller determines the length of anchor chain to deploy based on, at least in part, the feedback from one or more anchor deployment sensors. In this way, the length of the anchor cable or chain may be automatically selected to optimise its anchoring function and maximise its fatigue resistance, wear, and abrasion properties.

In embodiments, the controller further comprises a weather module for receiving weather conditions data, and for controlling the automated anchoring mechanism to retract the anchor if emergency weather conditions are detected. In this way, in the event of emergency weather conditions, the anchor may automatically retract to prevent damage.

In embodiments, the controller further determines the length of anchor cable to deploy based on, at least in part, the weather conditions data received by the weather module. In this way, the length of the anchor cable or chain may be automatically selected depending on the weather conditions to optimise its fatigue properties.

In embodiments, the automated anchoring mechanism comprises cleaning jets for jetting the anchor cable with fluid when the anchor is retracted. In this way, high pressure jetting of seawater over the anchor cable may reduce the build-up of marine foliage on the cable before it is retracted back into the anchor store. This may also help to minimize the drag coefficient on the anchor chain and the weight on the anchor mechanism. As such, an optimized design may be provided.

In embodiments, the controller comprises an autonomous navigation control module for controlling the self-propulsion system for navigating the vessel. In this way, the device may function as an autonomous vessel.

In embodiments, the autonomous navigation control module is configured to control the self-propulsion system for implementing a virtual anchor for anchoring the vessel. In this way, the device may maintain its position automatically based on a GPS and computer control through the controller and self-propulsion system.

In embodiments, the floating LiDAR device further comprises one or more sensors, and wherein the controller further comprises a memory for storing sensor data from the one or more sensors. In this way, the device may log sensor data, such as vertical wind profile data.

In embodiments, the floating vertical wind profile sensor device further comprises one or more telecommunications transceivers, and wherein the controller is further configured for transmitting sensor data from the one or more sensors via the one or more telecommunications transceivers. In this way, the device may communicate with a remote server, such as an onshore control centre, and provide current data sets for regular analysis.

In embodiments, the controller is further configured for receiving input signals via the one or more telecommunications transceivers for adjusting controls applied by the controller. In this way, the device may be controlled remotely and standing control instructions may be updated periodically.

In embodiments, the one or more sensors comprise at least one of: a radar sensor, a GPS sensor, a sonar sensor, a camera, a wind speed sensor, a rain sensor, an angular velocity sensor, an accelerometer (IMU), an acoustic current profiler, an acoustic doppler current profiler, a cup anemometer, a sonic anemometer, a barometric pressure sensor, an air temperature sensor, a humidity sensor, a wave sensor, a water temperature sensor, a water depth sensor, a water salinity sensor, a water conductivity sensor, a water turbidity sensor, a precipitation sensor, a particle size and velocity sensor, as solar radiation sensor, a visibility sensor, a cloud height sensor, a temperature profile sensor, a bird and bat monitoring sensor, a sea mammals sensor, biodiversity sensors, a hydrophone, an acidity sensor, seabed monitoring sensor, a micro plastic particles sensor, an algae sensor, a coral measurements sensor, a marine growth/foliage sensor, a sediments and scour sensor, device protection sensors, anti-theft sensors, seismic sensors, seabed vegetation sensors, guano sensor, water density sensor, air density sensor, above water acoustic sensors, below water acoustic sensors, an oil spill sensor, a water temperature profile sensor, current speed and direction sensors, and current velocity profile sensor.

The above sensor measurements may be performed as transient profiles. Furthermore, the wave measurements may include wave height, wave period, wave direction, time series of wave elevation. 2D sea state data may also be recorded, along with heave, sway, surge, pitch, roll and yaw of the device. Extreme events may also be logged.

In embodiments, the device may include anti-theft and/or protections systems. For example, the device may apply an electric shock to deter animals from congregating.

In embodiments, the device may further comprise a robotic arm. This may allow for some operations and repairs to be conducted remotely. In embodiments, the device may further comprise an integrated drone and/or under water autonomous device.

In embodiments, the device may further comprise a charging terminal configured to connect to a charging dock provided on a charging station.

In embodiments, the floating LiDAR device further comprises an energy store for powering the device, wherein the energy store comprises at least one of a battery, a fuel tank, and a fuel cell. In this way, the device may comprise one or more power train systems for driving functions on the device.

In embodiments, the floating LiDAR device further comprises a hull for housing the vertical wind profile sensor, the self-propulsion system, and the controller; and an enclosure for enclosing the hull, wherein the enclosure comprises a yellow display surface and the deployable special mark is mounted to the enclosure. In this way, the device may be provided as an enclosed vessel, with the deployable mark exposed on an upper surface for compliance with maritime regulations. In embodiments, the enclosure further comprises one or more indicator lights for emitting a sequence of flashes for designating the device as a special marker buoy. In embodiments, the hull is a monohull. Other hull configurations are also possible, such as a catamaran or trimaran.

According to a second aspect of the present invention, there is provided a method of determining a vertical wind profile at a target offshore location using a floating vertical wind profile sensor device according to any preceding claim, the method comprising: providing the controller with location data indicating the target offshore location; controlling, by the controller, the self-propulsion system to propel the device to the target offshore location based on the location data when the device is in vessel mode; determining, by the controller, that the device is at the target offshore location and anchoring the device at the target offshore location; switching, by the controller, the device from the vessel mode to the buoy mode, wherein switching to the buoy mode actuates the deployable special mark to switch to the deployed state; activating, by the controller, the LiDAR sensor for sensing the vertical wind speed profile; and recording, by the controller, vertical wind speed profile data.

In this way, an autonomous method may be provided for navigating the device to a desired target site for an offshore wind farm, at which the device may deploy automatically for recording measurement data. As such, this negates the need for a installation vessel, thereby saving the associated time and costs of towing or lifting operations.

In embodiments, the method further comprises the steps of: determining, by the controller, an end to the measurement session based on one of (a) determining that the vertical wind profile data has reached a measurement threshold, (b) the remaining energy stored in the energy store has dropped below a return range threshold, (c) an incoming control signal; and switching, by the controller, the device from the buoy mode to the vessel mode, wherein the switching to the vessel mode actuates the deployable special mark to switch to the undeployed state; unanchoring the device; controlling, by the controller, the self-propulsion system to propel the device to another location.

In this way, the device may automatically return to harbour or another target location at the end of a recording cycle. A cycle may be deemed completed based on a measurement threshold, such as a specified testing duration or quantity of data accumulated, or because the device is in need to maintenance/repair, it is running low on power or is remotely commanded to move locations.

According to a further aspect of the present invention, there is provided an anchor protection system for a marine vessel having a self-propulsion system, the anchor protection system comprising a controller for monitoring a radius of drift of the vessel about an anchor point, and identifying an entanglement when the radius reduces, wherein the controller 22 activates the self-propulsion system to reverse the drift in response to the detection of an entanglement.

An illustrative embodiment of the present invention will now be described with reference to the accompanying drawings in which.

Figure 1:
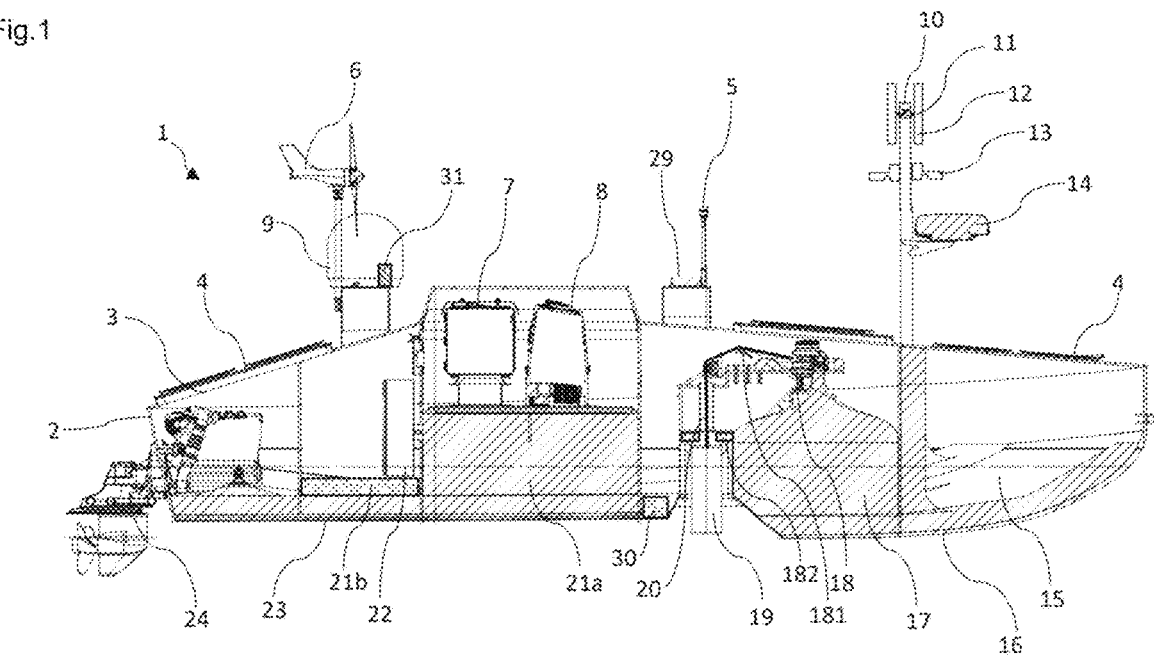
FIG. 1 shows a cross sectional view of a floating LiDAR device according to the illustrative embodiment.
Figure 2:
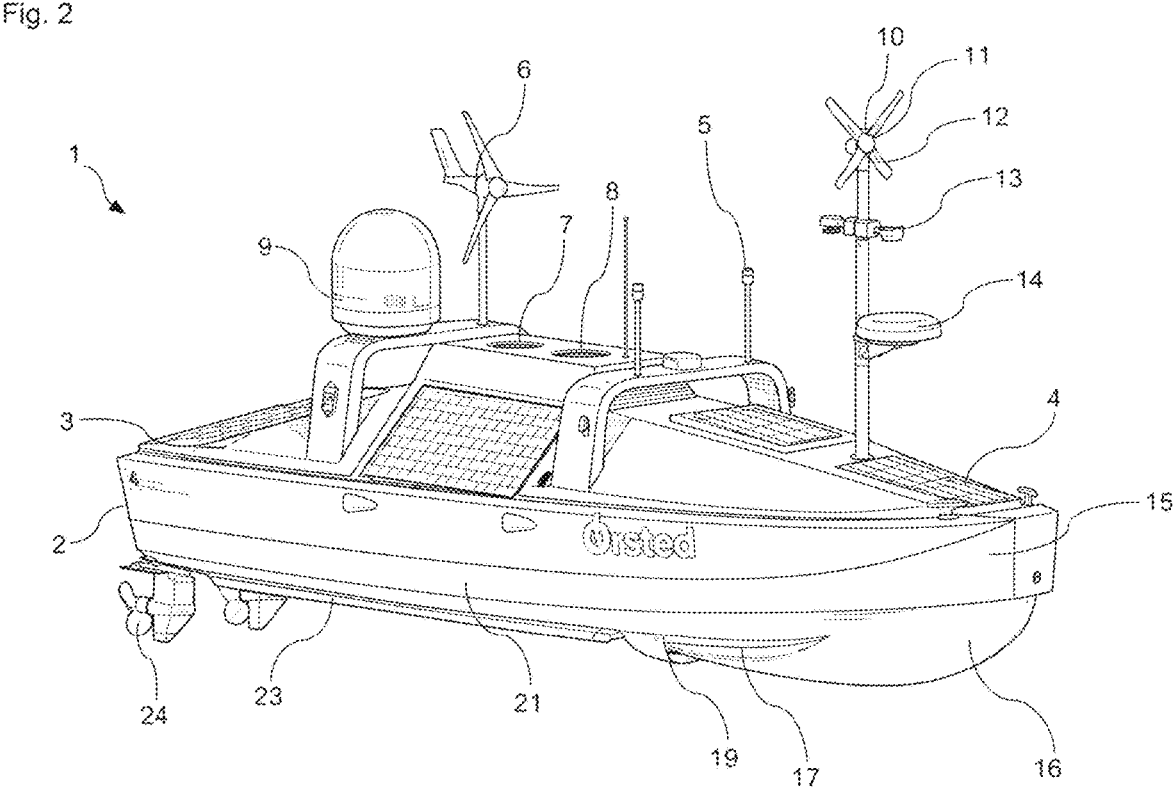
FIG. 2 shows a perspective view of the exterior of the floating LiDAR device shown in FIG. 1.

FIGS. 1 and 2 show a floating LiDAR device 1 according to an illustrative embodiment. The device 1 comprises a hull 2 which is enclosed by an enclosure 3 that forms a roof over the interior of the device. The enclosure 3 is provided in a substantially yellow colourway, albeit that the sensor housings and solar panels may not be yellow. The enclosure 3 and hull 2 form a container to minimise seawater ingress. The enclosure 3 will allow for natural ventilation and, as some seawater may ingress, an automatic bilge pump system is provided to remove water from within the vessel. The assembly is ballasted such that it uprights itself if the device 1 is turned over in the water. The enclosure 3 may also include bird spikes for deterring sea birds from congregating on the device. In embodiments, the device's payload compartment may be provided as a sealed unit allowing the LiDAR sensor systems to be housed without their own protective housings. This may therefore allow for cost reductions and space optimizations.

Within the interior of the device 1 is housed a controller 22 which provides a central control hub for the various systems on the device 1. In this embodiment, the controller 22 is provided as a single computer processing assembly, although it will be understood that in other embodiments, the controller may comprise a plurality of electronic control units which are networked together for performing coordinated functions.

A self-propulsion system 24 is provided at the stern and comprises propellers on steerable arms that extend from the body of the hull 2 and are driven by a motor housed beneath the enclosure 3. The steerable arms are movable under control of actuators built into the self-propulsion system 24 such that the propellers may be turned left or right to steer the hull 2 as it moves through the water. The controller 22 controls the self-propulsion system 24 to navigate the device through the water. In other embodiments, electrical motors may be used, with power being provided from batteries charged by a generator. For example, in embodiments the electrical drives could be azimuth pods that may be retractable into the hull 2 for better protection.

The base of the hull 2 comprises a flattened bottom region 23 at the aft of the device 1, which provides mounting points for additional sensors and allows the device 1 to be supported when loading into a container. The flattened bottom region 23 may also allow underwater projections, such as weighted keels or fins, to be attached for improving vessel stability where needed.

The forward region 16 of the base of the hull 2 forms a keel to the bow of the device, with this region 16 projecting deeper into the water than the flattened bottom region 23. The forward region 16 defines a void space 15 within the hull 2, which may be used for storage or for housing additional sensor components.

An anchor 19 is housed in an anchor recess between the forward region 16 and the flattened bottom region 23. As such, the anchor 19 is sheltered as the forward region 16 is driven through the water.

The anchor 19 is connected to an anchor chain or cable 20, which is connected through the hull 2 to a motorised windlass 18 for deploying and retracting the anchor 19 under the control of the controller 22. The windlass 18 is housed in a anchor compartment 17 within the hull 2. A pump (not shown) is provided within the anchor compartment 17 to pump seawater out of the compartment. The windlass 18 may include load and length sensors for sensing the load imposed on the anchor chain 20 and the length of cable dispensed. This anchor sensor data are fed back to the controller 22. The anchor windlass 18 further comprises a cleaning mechanism 182 in which a plurality of nozzles are configured in ring to jet seawater over the anchor chain 20 to remove any accumulated foliage before the chain is retracted back onto the windlass and the anchor compartment 17. As such, when the anchor 19 is retracted, a cleaning operation may be initiated to clean the anchor cable 20 as it is wound back into the device 1. This thereby helps to mitigate seizing of the anchor deployment system and provides for repeated deployment and retraction operations under the control of controller 22.

The anchor mechanism further includes an anchor chain lock 181, which is controllable to engage the anchor chain 20 for locking its position. As such, once engaged, the anchor chain lock 181 bears the static and dynamic forces from the anchor chain 20, thereby removing these stresses from the windlass 18. The anchor chain lock 181 incorporates a controllable actuator for engaging the lock, with the actuator being controlled autonomously or remotely via the controller 22.

An underwater through hull camera 30 is further provided for monitoring the anchor 19. The through hull camera 30 includes a light source for illuminating the camera's field of view.

The amidships region of the interior of the device 1 is provided with an energy store 21 comprising an electrical battery array 21b and a fuel tank 21a for storing fuel such as diesel or petrol. In this embodiment, the fuel tank 21a is used to supply fuel for powering the self-propulsion system 24, and diesel is used as the fuel. However, it will be understood that other embodiments may use other fuels or power sources. For example, in embodiments, an electrical self-propulsion system 24 powered by renewable sources may be used. The electrical battery array 21b is used to power the controller 22, as well as the electrical sensors, and the anchor windlass 18. Solar panels 4 and wind turbine generator 6 are provided on the exterior of the enclosure 3 for charging the battery array. An alternator within the self-propulsion system 24 is also provided to charge the battery array using fuel from the fuel tank. Refuelling and charging ports (not shown) are provided in the enclosure 3 for filling the fuel tank and recharging the battery array 21b.

Seated above the fuel tank 21a is a LiDAR compartment for housing a first LiDAR sensor 7 and a second LiDAR sensor 8. The provision of two separate LiDAR sensors 7, 8 allows two independent sets of measurements to be collected using, for example, sensors from different manufacturers or focused on different elevations. As such, more complete and accurate wind profile data may be collected. The LiDAR sensors 7 and 8 are positioned with their emitter and detector parts directed vertically upward from the device through sensor apertures provided in the roof of the enclosure 3 above them. As such, when activated, the sensors may scan vertically above the device for determining wind profile measurements. Measurement data are logged within a memory store within the controller 22, as well as being transmitted through a radio communication link for onshore storage, such as for example a cloud storage server.

The device 1 is provided with a plurality of further sensors for sensing its environment. In this embodiment, these sensors include radar sensor 14, GPS sensor 29, cameras 13, solar radiation sensors, rain sensors, temperature sensors, sonar, biological sensors (sea growth, sea mammal detection) and underwater cameras. Other sensors relevant to the measurement campaign may also be provided on the device 1. Furthermore, a communications antenna 5 is provided on an upper region of the enclosure 3 for two-way communication. In this embodiment, the communications antenna 5 comprises a radio and cellular antenna for two-way communication using a variety of different protocols. For example, the cellular antenna may be a 4g/LTE antenna. In other embodiments, a satellite antenna may be also provided. A weather station 9 is also provided for feeding weather data to the controller 22. The controller 22 may also receive weather data through the antenna 5, as well as control instructions and may transmit status and sensor data back to a control centre located onshore or on another vessel.

Within the interior of the device 1, a camera monitoring system (not shown) and a fire extinguishing system (not shown) may also be provided. The camera monitoring system allows remote monitoring of the functioning of the device 1 and the fire extinguishing system may be used to extinguish mechanical or electrical fires arising from the onboard systems. A pumping system (not shown) may also be provided for evacuating any water ingress in the event of a leak.

The device 1 is further provided with indicator lights 31 and a deployable special marker 10 on the exterior of its enclosure 3. The indicator lights 31 are located on the aft targa spoiler in this embodiment, and are controllable by the controller 22 for switching between a normal indicator function mode and a special marker mode. In the special marker mode, the indicator lights 31 are activated in a distinctive sequence of flashes associated with a special marker buoy. It will be understood that the device may also further include other lights for normal vessel operations.

Figure 3:
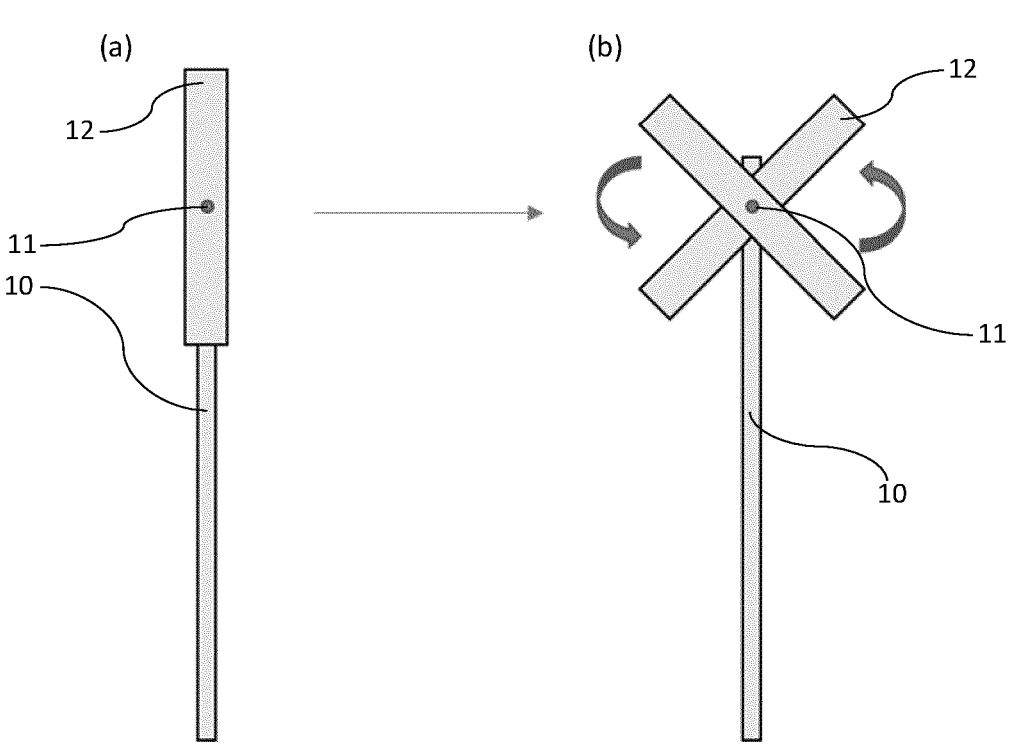
FIG. 3 shows a front view of the deployable special marker in an (a) undeployed position and (b) a deployed position.

The deployable special marker 10 comprises an actuator 11 located adjacent to the top of a support mast which extends up from the device enclosure. The actuator 11 is controlled by the controller 22 and is mechanically connected to two cross members 12 which are secured on opposing sides of the mast. This is shown in further detail in FIG. 3. When driven by the actuator 11, the cross members 12 are moveable between an undeployed position where they extend parallel with the mast, as shown in FIG. 3(a) and a deployed position where they form a cross configuration for designating the device 1 as a special marker buoy, as shown in FIG. 3(b).

In use, the device 1 may be launched from a harbour or another vessel. A target location for a potential wind farm may then be provided to the controller 22, for example by transmitting GPS routing coordinates from a control centre to the device 1, where it is received via its communications antenna 5.

In this state, the device is in an autonomous or remote-controlled vessel mode in which the deployable special marker 10 is in its undeployed position and the anchor 19 is retracted. The controller 22 then controls the self-propulsion system 24 to navigate the device 1 according to the GPS routing coordinates and feedback from its internal GPS sensor. At the same time, sensor data from the radar sensor 14 and cameras 14 are processed by the controller 22 so that the self-propulsion system 24 may be steered to avoid obstacles, such as geographic features, as well as other vessels and buoys. In this respect, a AIS (automatic identification system) transceiver is also provided on the device 1 for supporting safe navigation by the controller 22. The accelerometer or angular velocity sensors provide feedback to the controller 22 as the self-propulsion system 24 drives the device through waves. During this navigation process, a video feed from the cameras 13 is transmitted via antenna 5 to the control centre in order to fulfil the marine regulatory requirement for there to be a lookout present in order to avoid collisions. The cameras 13 may include microphones to also provide an audio feed to the control centre. In embodiments, a loud horn or speaker system may be further provided on the device for signalling to other vessels and relaying audio messages. For example, a public announcement speaker system provided on the vessel may form part of a theft protection system for warning off potential threats. For instance, video surveillance and/or proximity sensors may be used to detect the presence of a potential assailant and trigger an alarm or verbal warning to leave the vessel alone. A microphone may also be provided for two-way audio communication. The control centre may also remotely control other systems on the device 1, including the self-propulsion system 24 via controller 22.

Once the device 1 has reached the target location, the self-propulsion system 24 slows the device, and the controller 22 may then activate the anchor windlass 18 to deploy the anchor 19. During deployment, the throttle of the self-propulsion system 24 remains active while the anchor is deployed for steering the device 1 as the anchor is paid out. The load and length sensors within the windlass 18 also provide feedback information to the controller 22 such that deployment is halted once an optimised length of cable 20 has been deployed. The controller 22 may vary the optimised cable length depending on current weather data. Such weather data may be received as satellite data from the control centre via communications antenna 5 and/or onboard weather sensors. For instance, the length of deployed anchor cable 20 may be increased if the satellite data and angular velocity sensors indicate large swells.

During deployment, the controller 22 may operate the self-propulsion system 24 to control the anchor 19 as it descends to the seabed. For example, the device 1 may be propelled rearward while the anchor chain 20 is paid out for helping to mitigate the risk of the anchor chain 20 becoming tangled. The controller 22 may also control the self-propulsion system 22 to maintain a position and/or heading during anchor deployment. As such, the device's 1 speed may be controlled to ensure that the anchor chain 20 is laid out in a desired configuration and without dragging the anchor 19 off position. To facilitate this, the controller 22 may receive feedback sensor inputs including the device's speed, its GPS position, chain length meterage, as well as data for the anchor drop position. The controller 22 may also use algorithms for chain catenary for the given water depth.

Once deployed, the controller 22 continues to monitor the weather data and may adjust the length of the deployed anchor cable by operating the windlass 18 to mitigate damage to the anchor 19, the anchor chain 20, the device 1, or the seabed. The self-propulsion system 24 may also be activated by the controller 22 to counteract drifting of the device which could result in dragging the anchor, or to turn the device to otherwise minimise anchor drag. This may thereby reduce wear on the anchor 19 and anchor cable 20. In the event that extreme weather conditions are identified, the controller 22 may operate the windlass 18 to retract the anchor entirely and possibly move the device 1 to a safer location. In such circumstances, or in deep water locations, the controller 22 may activate a virtual anchor in which the position of the device 1 is maintained based on GPS positional data using the self-propulsion system.

Once the device has been anchored at the target location, the controller 22 may activate the actuator 11 to deploy the cross members 12 such that a cross is displayed on the deployable special marker 10. At the same time, the indicator lights 9 may be switched to emit a sequence of flashes consistent with special marker requirements. Consequently, in this mode, the device 1 is deemed to be a special marker buoy under international maritime regulations. Importantly, this means that the device no longer requires active monitoring or a lookout as a regulatory requirement. Consequently, the device 1 may remain moored in its anchored location for extended periods of time without being actively monitored. This would not be permitted in a conventional autonomous vessel as, for example, rule 5 in the International Regulations for Preventing Collisions at Sea (COLREG) requires that every vessel has a lookout present at all times. The device 1 thereby circumvents this regulatory requirement by functioning as a vessel for the navigation to the target site, with the device being remotely monitored via cameras 13, and then switching from a vessel into a special marker buoy at the target location for long term data collection operations.

In this connection, once the device 1 is anchored and in the special marker mode, the controller 22 may activate its various sensors, including the LiDAR sensor 8, and begin logging sensor data measurements. During this time, solar and wind energy may be collected by solar panels 4 and wind turbine generator 6 for charging the battery part of the energy store 21. The controller 22 may also start the onboard engines of the self-propulsion system 24 for generating electrical power for recharging the batteries.

During the data collection phase, when in the special marker mode, the accelerometer/angular velocity sensors are also used to monitor the motions of the vessel in order to translate the vessel motion to a 2D sea state wave spectrum. The vessel motion data may also be used to support motion compensation of sensor measurements, such as the sensor measurements from the LiDAR sensors 7, 8.

Figure 4:
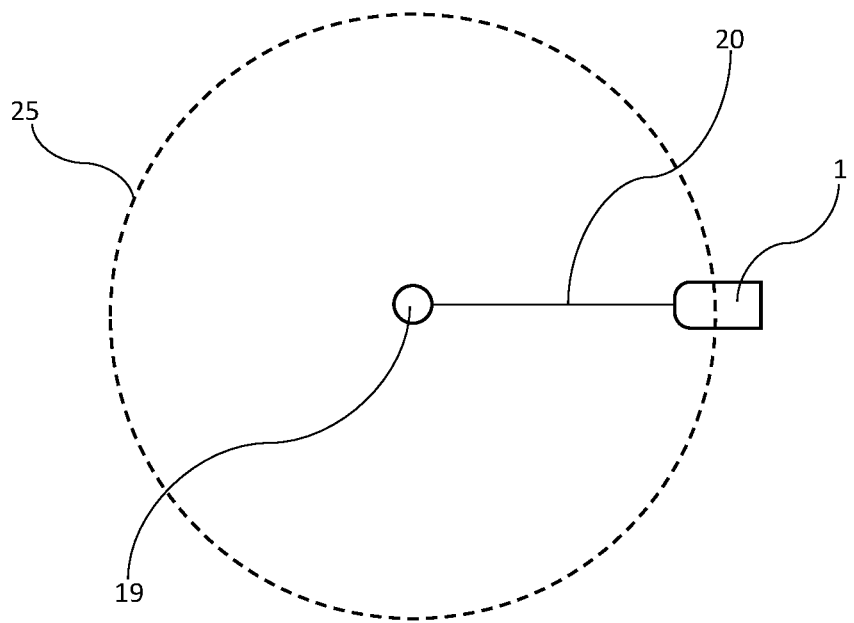
FIG. 4 shows a schematic above view of the device about an anchor position.

While anchored, the controller 22 may also implement a number of protection systems. Some of these systems are described in further detail with reference to FIGS. 4 to 9. In this respect, FIG. 4 shows a schematic above view of a device 1 tethered to an anchor 19 by the anchor chain 20. As will be understood, the device 1 may move about the anchor 19 in a perimeter 25 at a radius defined by the length of the anchor chain 20. When anchored by anchor 19, the controller 22 may log the device's GPS position and automatically detect an anchor chain break or vessel drift in the event that the device moves outside of the perimeter 25 associated with the deployed anchor position.

Figures 5, 6:
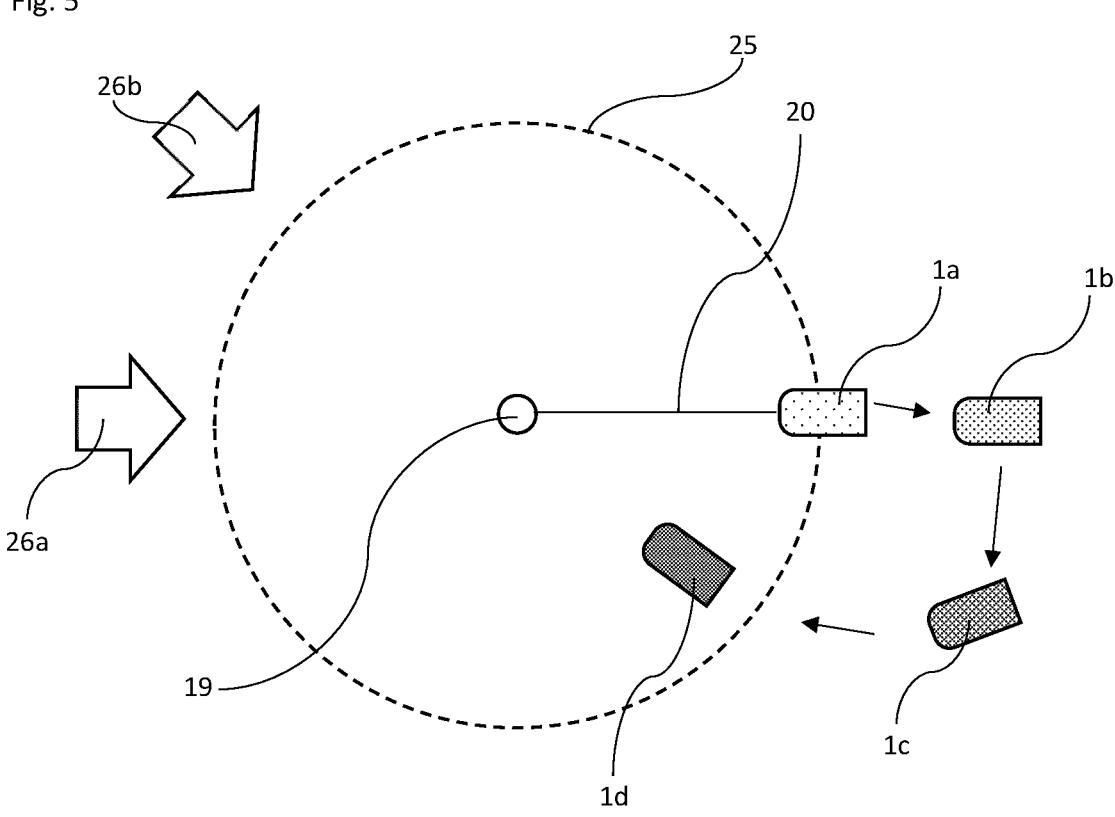
FIG. 5 shows a schematic above view of an implementation of the anchor detachment system.
FIG. 6 shows a schematic above view of an anchor drag scenario.

In this connection, FIG. 5 shows a schematic illustration of an anchor detachment system implemented by the controller 22. With the wind in direction 26a, the device in position 1a may drift away from the expected perimeter 25 defined by the anchor chain 20 length into position 1b. The change in position away from the perimeter 25 is correlated to the wind and current speeds and the position and direction is determined by the onboard GPS and positional sensors. For example, the device 1 is likely to rotate in the event of a chain break. If detected, the controller 22 will activate the anchor windlass 18 to retract the remaining anchor chain 20. The onboard self-propulsion system 24 is also activated and controlled by the controller 22 to navigate the device back into perimeter 25 from position 1c and 1d. The position 1d is then maintained, even in a change of wind direction to 26b by the self-propulsion system 24. This thereby avoids uncontrollable drift.

FIG. 6 shows a schematic above view of an anchor drag scenario where the anchor is dragged over the seabed from position 19a to 19b. This movement is again detected by the controller 22 monitoring the device's position over time and identifying a change in perimeter from 25a to 25b. This change will be relatively slow compared to the above anchor chain breakage scenario, and may be the result of the anchor chain length being too short for the environmental conditions. The controller 22 may therefore control the anchor windlass 18 to increase the anchor chain length.

Figure 7:
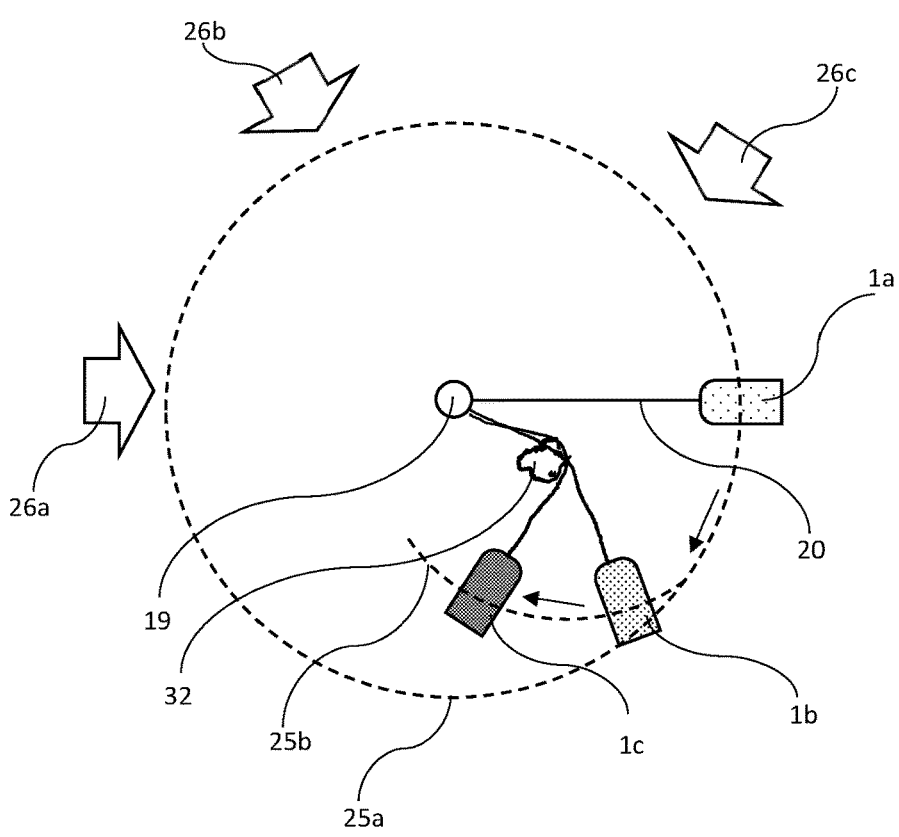
FIG. 7 shows a schematic above view of an implementation of the anchor untangle system.

Furthermore, an automatic system for detecting and preventing chain 20 snatching/entanglement may also be implemented, as shown in FIG. 7. For this, the controller 22 may continuously log the position of device 1 and identify an entanglement when the radius of drift about the anchor 19 reduces. For example, in FIG. 7, a change in wind direction from directions 26a to 26b to 26c would be expected to cause the device 1 to move around the perimeter 25a. During this movement, the anchor chain will drag over the seabed following the change in device's position as a result of wind, current and wave direction. However, if the anchor chain 20 becomes caught by an object 32, the object will effectively act as a new anchor point. This causes the device 1 to move inwards from the original perimeter 25a to path 25b in a spiral like motion around the object 32 as the wind direction changes. This can cause entanglement of the chain 20 with the object 32. However, the change in device's position and movement is detected and the entanglement direction is determined by the controller 22. In response, the controller 22 can engage the self-propulsion system 24 to automatically untangle the chain 20 by reversing the rotation. The controller 22 may also then determine that the device 1 needs to be repositioned in a new location and may therefore activate the windlass 18 to retract chain 20 before the self-propulsion system 24 repositions the device 1. This may thereby enable safe operation of the device 1 and reduce the potential damage to the seabed over conventional moored buoy systems.

The controller 22 is also able to implement an anti-twist system in order to mitigate the risk of twisting of the anchor chain 20 that could otherwise result in knots. During anchor deployment, rotational movement of the device clockwise and counter clockwise around the anchor point is monitored and the anchor chain 20 may be automatically retracted after a certain amount of rotation in one direction. Retraction may then be stopped once the anchor 19 hangs freely in the water column, and a swivel joint provided between the anchor 19 and the chain 20 allows the anchor 19 to counter rotate to release any twisting. The device's position is maintained automatically via the onboard self-propulsion system 24, and once the twist has been released the anchor chain 20 may be automatically redeployed.

Figure 8:
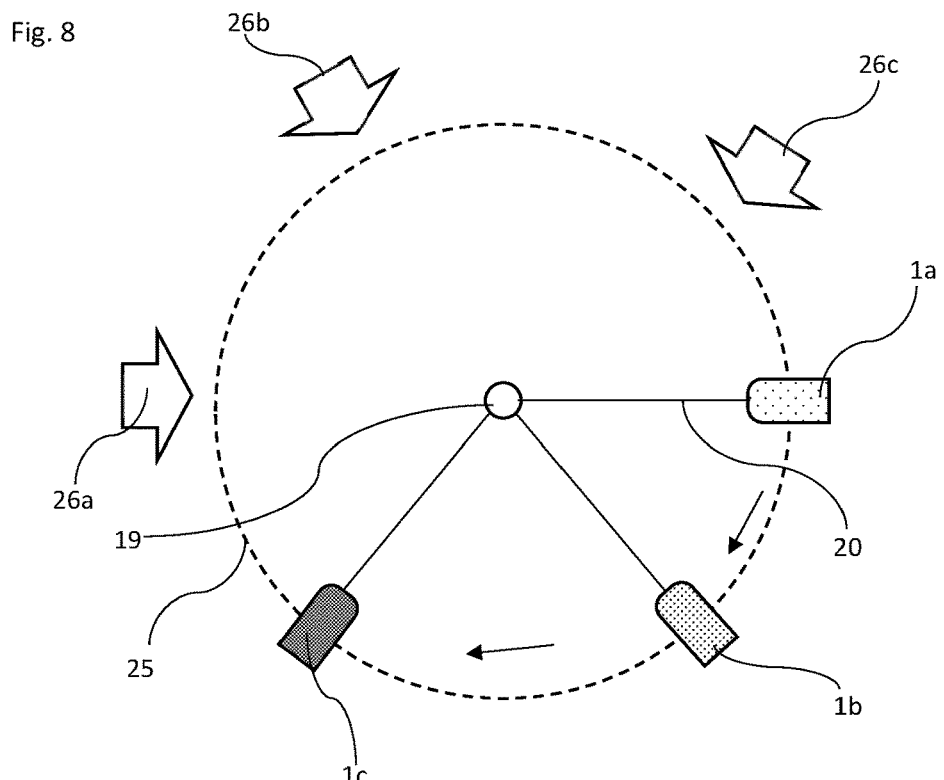
FIG. 8 shows a schematic above view of an implementation of the anchor untwist system.

While the anchor 19 is deployed, the anti-twist system may also act to prevent twisting, as shown in FIG. 8. In use, the device 1 will normally move around the perimeter 25 as a result of wind, current and wave direction, thereby dragging the anchor chain 20 over the seabed. The controller 22 monitors and counts the number of clockwise and counter clockwise rotations around the anchor point 19. The controller 22 may then activate the self-propulsion system to navigate in the opposite direction to counter the positive rotation in one direction. Alternatively, the controller 22 may retract the anchor 19 until it hangs freely in the water column, and allow the chain 20 to spin and offset any twist. The anchor 19 may then be redeployed in a new position.

In an emergency scenario, such as extreme weather or if the anchor is irreversibly entangled, the controller 22 may also actuate the anchor windlass 18 to completely detach the anchor chain 20. This ensures the device 1 does not become irrevocably attached to the anchor chain and seabed. In this process, the windlass 18 may pay out the full chain length until its end is released. The controller 22 may then automatically start the onboard self-propulsion system 24 to position the device 1 a safe distance from the anchor chain 20. The controller 22 may then log the chain 20 position. The end of the chain 20 will also be provided with a buoyant rope spliced to it, with length of the rope corresponding to maximum water depth on site. These features thereby allow for easy locating and subsequent salvage of the detached anchor chain 20 by another vessel.

Figure 9:
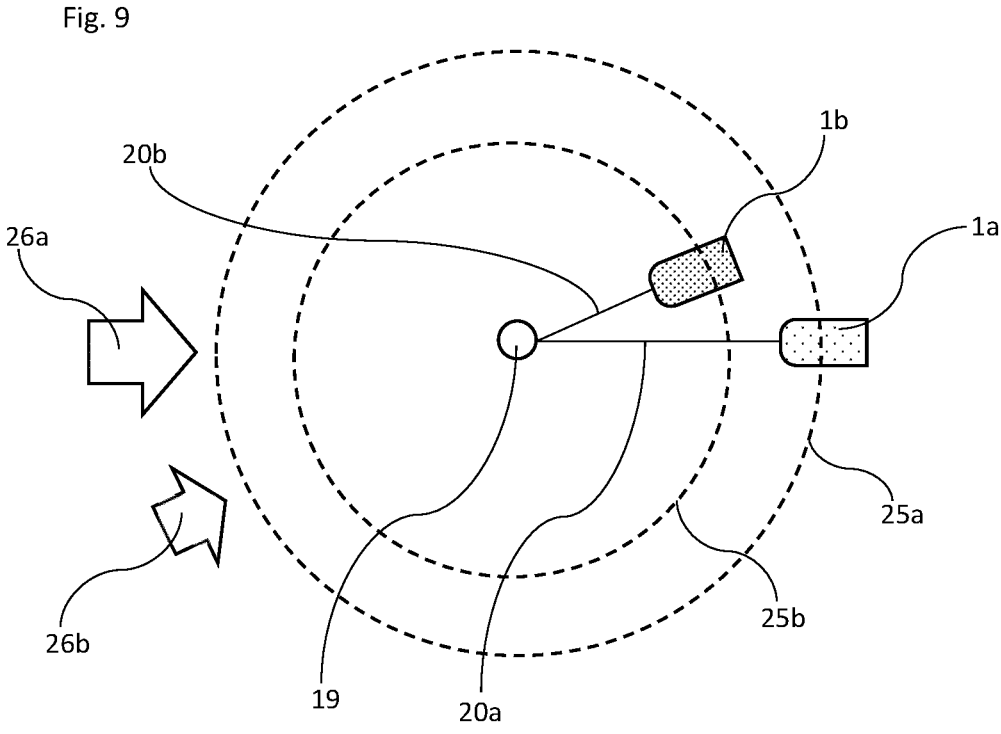
FIG. 9 shows a schematic above view of an implementation of the anchor length adjustment system.

FIG. 9 shows a schematic above view of an implementation of the anchor length adjustment system provided by the controller 22. With this system the anchor chain length is adjusted depending on the environmental conditions. For example, in higher wind speed conditions, as marked in wind direction 26a, the anchor chain 20a may be set to a longer chain length. Conversely, in lower wind speed conditions, as marked in wind direction 26b, the controller 22 may set the anchor chain 20b to a shorter length. This may thereby reduce anchor chain wear and fatigue, and lower the risk of chain entanglement. Furthermore, where shorter anchor chain lengths can be used, the device 1 benefits from increased stability due to the chain weight stored onboard, as well as helping to minimize the impact on seabed from chain dragging over its surface. Again, in extreme weather and sea state conditions, the controller 22 may retract the anchor chain 20 and control the self-propulsion system 24 to maintain the device 1 in position.

The device 1 may remain at the location for an extended period, typically 12 months or more, during which vertical wind profile data and other environmental data are collected for evaluation of the location for a wind farm site. During this time, data may be periodically transmitted back to the control centre via antenna 5 for analysis. After a predetermined time period, or if the energy or data store capacity has been reached, the controller 22 may determine that the measurement session has completed. In response, the controller 22 may activate the windlass 18 to retract the anchor 19. During this process, the cleaning system in the windlass 18 may jet the anchor cable 20 with water to remove any foliage. If the anchor 19 becomes snagged, the controller 22 may activate the self-propulsion system 24 to move the device 1 for untangling the cable 20 and releasing the anchor 19.

At the same time as the above, the controller 22 activates the actuator 11 to move the cross members 11 to their undeployed position for retracting the special mark. The indicator lights 9 may also be switched off or to a normal vessel indication pattern. Human monitoring from the control centre via cameras 13 may also resume. As such, the device 1 is switched back to a vessel mode and the controller 22 can control the self-propulsion system 24 to navigate the device 1. The device 1 may, for example, be navigated to a new location for a new measurement session, or back to harbour or another vessel for refuelling and repairs. In embodiments, the device 1 may be remotely triggered by a control centre on a manned vessel or at the harbour to navigate to the vessel or harbour location for refuelling and/or recharging of its batteries. After this, the device may propel itself back to the target location to resume measurements. Consequently, longer measurements sessions with smaller energy stores may be implemented by periodically recharging its fuel and battery stores.

Importantly, because the device 1 is able to undertake these repair and recharging actions autonomously, albeit that the device must be monitored for regulatory purposes, these operations may be undertaken much more cost effectively. For instance, in the case of a conventional floating LiDAR device, a manned ship would need to travel to each device individually, detach its mooring, and tow or lift the device to a suitable location for repair or recharging. This process may result in large time/cost overhead due to waiting time for installation vessel availability and a suitable weather window to allow safe working conditions for recovery and repair operations. This complexity leads to difficult and expensive planning, and may result ultimately in high costs and risk of extended data losses.

It will be understood that the embodiments illustrated above show applications of the invention only for the purposes of illustration. In practice the invention may be applied to many different configurations, the detailed embodiments being straightforward for those skilled in the art to implement.

For example, although in the above illustrative embodiment, the deployable special marker is provided with moveable cross members, it will be understood that other deployment mechanisms may be used. For example, the cross marker may be provided on an extendable mast which is folded out to an upright position for deploying the special mark.

Furthermore, although the above illustrative embodiment has been provided with fully autonomous functionality, it will be understood that the device may be remotely controlled, with functions on the device being user triggered remotely, but actioned autonomously on the device itself.

Moreover, embodiments may also incorporate other means of propulsion and power generation systems, aside from those described above in relation to the illustrative embodiment. For example, rather than a marine diesel engine, an electrical propulsion system comprising a plurality of electrical pods may be used. In such cases, diesel, or other fuel, generator may be used to charge the device's batteries, thereby forming a hybrid propulsion system.

In embodiments, the controller 22 may also implement an automatic power management system. Under this system's control, the fuel generators may be automatically activated when the battery charge level drops below a threshold value. The regenerative power provided by solar PV and wind turbines may also be used to support battery recharging.

Due to the extended periods of operation, the controller 22 may also implement automatic duty cycling of the onboard systems, including the self-propulsion system, to ensure working operation is maintained. Under this system, the controller 22 may automatically start and running the device's engines, generators, and actuators to ensure functions are maintained and moving parts haven't seized. As part of this, the propulsion system may be activated to minimize accumulation of marine foliage on propellers and drive train. The anchor chain 20 may also be periodically cleaned. The batteries may also be recharged periodically to maintain charge levels and battery health.

Figure 10:
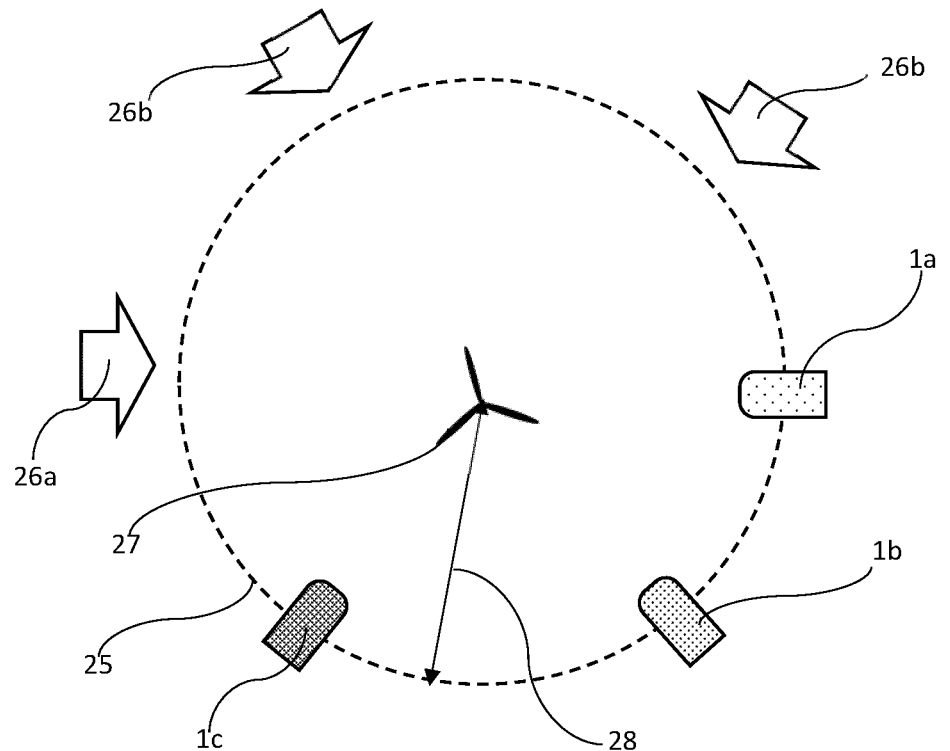
FIG. 10 shows a schematic above view of wind turbine impact evaluation protocol.

Although the device 1 has been described in the context of determining wind profile data for a potential new wind turbine generator site, it will be understood that the device may also be used for other wind profile testing methodologies. For example, FIG. 10 shows a schematic illustration of testing methodology for performing a power curve validation of an existing wind turbine generator (WTG) 27. In this methodology, the device 1 will maintain a pre-set distance from the WTG 27 using its self-propulsion system 24, and move around the WTG 27 according to the wind direction. This is shown by positions 1*a-c* and wind directions 26*a-c* in FIG. 10. As such, the device 1 can record measurements from both in front and behind the WTG 27. This thereby provides wind profile data for the free wind ahead of the WTG 27, and for the turbulent wind profile behind the WTG 27, which may then be used to evaluate the impact of the WTG 27.

It will also be understood that, in embodiments, a moon pool or wet porch may also be provided in the hull. Such a moon pool may provide an opening in the floor or base of the hull for giving access to the water below. As such, sensors and other instruments may be lowered into the sea therethrough. For example, soil samples may be obtained by lowering a sample collection instrument through the moon pool. Integrated winches may also be provided for raising and lowering items through the moon pool.

Furthermore, in embodiments, a gondola may also be mounted beneath the hull for housing a number of sensors. For example, the gondola may be provided at the end of a support arm projecting down below the water surface. As such, sensors may be located in a reduced-noise and bubble-free environment. In embodiments, the gondola may be retractable. Additional sensors may also be provided in a barge which may be connected to and towed by the device. These arrangements may allow, for example, different sensor sets to be attached to the vessel as needed.

It will also be understood that in embodiments, sensors may be incorporated for hydrographic and oceanographic profiling and surveillance. For instance, there may be provided one or more of a multibeam echo sounder, a sub bottom profiler, a side scan sonar, a seismic survey sensor, a sound velocity profiler, a temperature sensor, a salinity sensor, a SONAR sensor, and a LiDAR sensor. In arrangements, the device may be provided as a site investigation device for profiling potential new installation sites for wind turbine installations, for example.

In this connection, according to a further aspect, there may be provided a floating marine site survey device comprising: one or more survey sensors; a self-propulsion system for propelling the device through a body of water; a deployable special mark, actuatable to switch between a deployed state for identifying the device as a special marker buoy and an undeployed state for identifying the device as a vessel; and a controller for switching the device from a vessel mode to a buoy mode when the vessel is anchored, wherein the controller switches the special mark to the deployed state when the device is in the buoy mode, and wherein the one or more survey sensors include one or more of a multibeam echo sounder, a sub bottom profiler, a side scan sonar, a seismic survey sensor, a sound velocity profiler, a temperature sensor, a salinity sensor, a SONAR sensor, and a LiDAR sensor.

In such scenarios where hydrographic and oceanographic profiling and surveillance equipment is provided, one or more devices may be instructed to autonomously perform site surveys at pre-determined locations, for instance covering a geographical grid, or following a pre-set path. As such the seabed profile and composition, as well as the subsea characteristics may be evaluated over an expanded area. As such, potential geohazards and soil properties may be identified, thereby allowing site feasibility to be evaluated at a lower cost. Furthermore, as such devices don't need to return to harbour in bad weather, deployment isn't weather dependent and hence improved flexibility is provided.

Similar to the above, the device may also be used to monitor a monopile site during and after installation. For instance, the device may be provided independent of the support vessel to remain at the installation site while the monopile settles. As such, issues such as cable exposure or dredging can be monitored, without requiring the support vessel to stay on site. This may thereby provide an early warning to potential installation issues.

Finally, the above embodiments incorporate a number of anchor protection systems and methods for protecting the device, the anchor, its chain, and the seabed. However, it will be understood that these systems and methods may also be applied to other marine vessels.

The invention claimed is:

1. A floating marine site survey device comprising:
a vertical wind profile sensor for sensing a vertical wind profile;
a self-propulsion system for propelling the device through a body of water;
a deployable special mark, actuatable to switch between a deployed state for identifying the device as a special marker buoy and an undeployed state for identifying the device as a vessel; and
a controller for switching the device from a vessel mode to a buoy mode when the vessel is anchored, wherein the controller switches the special mark to the deployed state when the device is in the buoy mode.

2. A floating marine site survey device according to claim 1, further comprising:
an automated anchoring mechanism for deploying and retracting an anchor on an anchor cable, and
wherein the controller is configured to control the automated anchoring mechanism to deploy the anchor when the device is in the buoy mode.

3. A floating marine site survey device according to claim 2, wherein the controller receives feedback from one or more anchor deployment sensors, wherein the controller determines a length of anchor cable to deploy based on, at least in part, the feedback from one or more anchor deployment sensors.

4. A floating marine site survey device according to claim 2, wherein the controller further comprises a weather module for receiving weather conditions data, and for controlling the automated anchoring mechanism to retract the anchor if emergency weather conditions are detected.

5. A floating marine site survey device according to claim 4, wherein the controller further determines a length of anchor cable to deploy based on, at least in part, the weather conditions data received by the weather module.

6. A floating marine site survey device according to claim 2, wherein the automated anchoring mechanism comprises cleaning jets for jetting the anchor cable with fluid when the anchor is retracted.

7. A floating marine site survey device according to claim 1, wherein the controller comprises an autonomous navigation control module for controlling the self-propulsion system for navigating the vessel.

8. A floating marine site survey device according to claim 7, wherein the autonomous navigation control module is configured to control the self-propulsion system for implementing a virtual anchor for anchoring the vessel.

9. A floating marine site survey device according to claim 1, further comprising one or more sensors, and
wherein the controller further comprises a memory for storing sensor data from the one or more sensors.

10. A floating marine site survey device according to claim 9, further comprising one or more telecommunications transceivers, and
wherein the controller is further configured for transmitting sensor data from the one or more sensors via the one or more telecommunications transceivers.

11. A floating marine site survey device according to claim 10, wherein the controller is further configured for receiving input signals via the one or more telecommunications transceivers for adjusting controls applied by the controller.

12. A floating marine site survey device according to claim 9, wherein the one or more sensors comprise one or more of: a radar sensor, a GPS sensor, a sonar sensor, a camera, a wind speed sensor, a rain sensor, an angular velocity sensor, an acoustic doppler current profiler, an acoustic current profiler, a cup anemometer, a sonic anemometer, a barometric pressure sensor, an air temperature sensor, a humidity sensor, a wave sensor, a water temperature sensor, a water depth sensor, a water salinity sensor, a water conductivity sensor, a water turbidity sensor, a precipitation sensor, a particle size and velocity sensor, as solar radiation sensor, a visibility sensor, a cloud height sensor, a temperature profile sensor, a bird and bat monitoring sensor, a sea mammals sensor, biodiversity sensors, seabed monitoring sensor, a micro plastic particles sensor, an algae sensor, a coral measurements sensor, a marine growth/foliage sensor, a sediments and scour sensor, device protection sensors, anti-theft sensors, seismic sensors, seabed vegetation sensors, guano sensor, water density sensor, air density sensor, above water acoustic sensors, below water acoustic sensors, an oil spill sensor, a water temperature profile sensor, current speed and direction sensors, and current velocity profile sensor.

13. A floating marine site survey device according to claim 1, further comprising:
a hull for housing the vertical wind profile sensor, the self-propulsion system, and the controller; and
an enclosure for enclosing the hull, wherein the enclosure comprises a yellow display surface and the deployable special mark is mounted to the enclosure.

14. A method of determining a vertical wind profile at a target offshore location using a floating marine site survey device according to claim 1, the method comprising:
providing the controller with location data indicating the target offshore location;
controlling, by the controller, the self-propulsion system to propel the device to the target offshore location based on the location data when the device is in vessel mode;
determining, by the controller, that the device is at the target offshore location and anchoring the device at the target offshore location;
switching, by the controller, the device from the vessel mode to the buoy mode, wherein switching to the buoy mode actuates the deployable special mark to switch to the deployed state;
activating, by the controller, the LiDAR sensor for sensing the vertical wind profile; and
recording, by the controller, the vertical wind profile data.

15. A method according to claim 14, further comprising the steps of determining, by the controller, an end to the measurement session based on one of (a) vertical wind speed profile data has reached a measurement threshold, (b) remaining energy stored in the energy store has dropped below a return range threshold, or (c) an incoming control signal;

switching, by the controller, the device from the buoy mode to the vessel mode, wherein the switching to the vessel mode actuates the deployable special mark to switch to the undeployed state;

unanchoring the device; and controlling, by the controller, the self-propulsion system to propel the device to another location.

16. A floating marine site survey device comprising:

one or more survey sensors, the one or more survey sensors comprising a vertical wind profile sensor for sensing a vertical wind profile;

a self-propulsion system for propelling the device through a body of water;

a deployable special mark comprising two cross members, actuatable to switch between a deployed state where the two cross members are in a crossed configuration for identifying the device as a special marker buoy and an undeployed state where the two cross members are in a parallel configuration for identifying the device as a vessel; and a controller for switching the device from a vessel mode to a buoy mode when the vessel is anchored, wherein the controller switches the special mark to the deployed state when the device is in the buoy mode.

17. A floating marine site survey device according to claim 16, wherein the one or more survey sensors comprise one or more of: a multibeam echo sounder, a sub bottom profiler, a side scan sonar, a seismic survey sensor, a sound velocity profiler, a temperature sensor, a salinity sensor, a SONAR sensor, and a LiDAR sensor.

\* \* \* \* \*